United States Patent Office 3,396,138
Patented Aug. 6, 1968

3,396,138
ORGANIC ACID RESISTANT COMPOSITIONS FROM EPOXY RESIN, POLYAMINES AND CLAY
Ernest E. Weller, Sayreville, N.J., assignor to Tile Council of America, Inc., a corporation of New York
No Drawing. Continuation-in-part of application Ser. No. 391,319, Aug. 21, 1964. This application Oct. 23, 1964, Ser. No. 406,142
43 Claims. (Cl. 260—37)

This invention relates to epoxy resin compositions having improved chemical resistance and more particularly to polyepoxide compositions capable of being resinified at room temperature and exhibiting resistance to chemical attack, to methods of preparing such compositions and to methods of using them.

It is widely known that use of epoxy resins for many applications is prompted by the resistance of such resins, when cured, to a great variety of severe corrosion, e.g., chemical environments. Epoxy resin compositions that are heat cured exhibit great resistance to and stand up well under such corrosion environments. Frequently circumstances, including cost and convenience, dictate that a room temperature hardening material be employed in chemical containing environments.

It is well known, however, that the resistance of room temperature cured epoxies to certain chemical environments is low and in many instances completely unsatisfactory, and therefore such materials are ordinarily not used in areas where they are likely to be subjected to chemical attack.

Certain amine-type materials are commercially used as room temperature curing agents for polyepoxides, such as the commercially available glycidyl polyethers of polyhydric phenols. The products cured with such amine curing agents, however, tend to be prone to attack by chemical environments, especially organic acids. Lack of resistance to attack by organic acids is a property of epoxies cured with the so-called amine-type curing agents even when high curing temperatures are employed.

It is an object of the invention to provide polyepoxide resin compositions having improved resistance to deterioration when exposed to chemical environments, especially organic acids.

It is another object of the invention to provide hardenable polyepoxide resin compositions employing amine-type curing agents that upon curing form products that exhibit improved resistance to deterioration by concentrated organic acids.

It is a further object of the invention to provide means for making room temperature curing epoxide resin compositions resistant to attack by organic acids.

It is a further object of the invention to provide new means and methods for making polyepoxide resin products cured with amine-type curing agents resistant to attack by organic acids.

It is still a further object of the invention to provide new means and methods for curing polyepoxide resin products at room temperature so as to enhance the resistance of the cured product to attack by organic acids.

These and other objects of the invention will be apparent from the following detailed description thereof.

According to this invention there are provided hardenable epoxy resin compositions having the chemical resistant and curing properties described which comprise epoxy resin, an epoxy resin curing agent and, in a sufficient amount, a protective reactive colloid for the large resin molecules.

More specifically, it has been discovered that when clay minerals that exhibit substantial comparatively high base-exchange properties and containing replaceable cations are incorporated into a polyepoxide composition adapted to be hardened at room temperature and/or employing an amine-type curing agent, the cured polyepoxide product exhibits surprisingly increased resistance to attack by concentrated organic acids. For example, a composition comprising a polyepoxide resin, an amine-type curing agent and a colloidal clay mineral will harden at room temperature into a product exhibiting the properties usually associated with cured polyepoxide resin coatings, adhesives, etc. Additionally, the cured composition surprisingly will be serviceable in areas where organic acid environments, even of a concentrated nature, will be encountered.

Clay minerals have the property of sorbing certain cations and retaining these in an exchangeable state. The common exchangeable cations are calcium, magnesium and sodium, including mixtures thereof. The pH of the mineral material is indicative of the exchangeable cation that it carries, a pH of less than 7 suggesting hydrogen cations.

Clay minerals that are suitable for use in this invention are those exhibiting substantial base-exchange properties and containing replaceable cations such as alkali and alkaline-earth metals, ammonium, including mixtures thereof. Typical suitable clay minerals include montmorillonite, viz. sodium, potassium, calcium, ammonium and other bentonite clays, hectorite, saponite, attapulgite, illite, vermiculite and zeolites. These minerals, characterized by an unbalanced crystal lattice have negative charges which are normally neutralized by inorganic cations.

The base exchange capacities of the various clay minerals enumerated run from about 15 to about 150, based upon milliequivalents of exchangeable base per 100 grams of clay. The montmorillonite and vermiculite minerals have high base-exchange capacities, e.g., 80–100 and 100–150 respectively. Attapulgite has a comparatively high base-exchange capacity, e.g., 20–30. Generally, clay minerals which have a high base-exchange capacity, i.e., of at least 20, are most useful in the present invention.

The nature of the exchangeable ion may influence the physical properties of the clay mineral and the water absorption and swelling characteristics of several of the above-noted minerals, e.g., montmorillonites. Although this is important for many applications, it does not appear significant in the compositions of the present invention as will be see in the accompanying examples.

Most suitable and preferred clay minerals for use in this invention are refined and substantially contaminant and grit free swelling and non-swelling montmorillonite minerals and bentonites of the Western and Southern types, attapulgite and vermiculite. Typical of the preferred materials are the sodium, calcium, ammonium montmorillonites including mixtures thereof, bentonite clays comprising sodium, calcium and ammonium montmorillonite minerals, attapulgite and vermiculite mineral-containing clays.

The resinous epoxides suitable for use in the present invention comprise those compounds having at least two epoxy groups, i.e., at least two

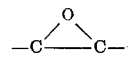

groups per molecule. The polyepoxides may be saturated or unsaturated, cycloaliphatic, aromatic, heterocyclic, or preferably aliphatic, and may be substituted if desired with substituents such as chlorine atoms, hydroxyl groups, ether radicals, and the like. They may also be monomeric or polymeric. The epoxy may be either present as a terminal or interior group.

Examples of the polyepoxides include, among others, the diacetate of epoxidized triglycerides as epoxidized glycerol trioleate and epoxidized glycerol trilinoleate, glycerol dioleate, 1,4-bis(2,3-epoxypropoxy) benzene, 1,3-bis(2,3-epoxypropoxy) benzene, 4,4′-bis(2,3-epoxypropoxy) dipheny ether, 1,8-bis(2,3-epoxypropoxy)-octane, 1,4-bis(2,3-epoxypropoxy)-cyclohexane, 4,4′-bis(2-hydroxy-3,4-epoxybutoxy)-diphenyldimethylmethane, 1,3-bis(4,5-epoxypentoxy)-5-chloro - benzene, 1,4 - bis(3,4-epoxybutoxy)-2-chlorocyclohexane, 1,3 - bis(2-hydroxy-3,4-epoxybutoxy) benzene, 1,4-bis and (2-hydroxy-4,5-epoxypentoxy) benzene.

Other examples include the epoxy polyethers of polyhydric phenols obtained by reacting a polyhydric phenol with a halogen containing epoxide in an alkaline medium. Polyhydric phenols that can be used for this purpose include, among others, resorcinol, catechol, hydroquinone, methyl resorcinol, or polynuclear phenols, such as 2,2-bis (4-hydroxyphenyl) propane (Bis-phenol A), 2,2-bis(4-hydroxyphenol) butane, 4,4′-dihydroxybenzophenone, bis(4-hydroxyphenyl) ethane, 2,2-bis(4-hydroxyphenol) pentane, and 1,5-dihydroxynaphthalene. The halogen-containing epoxides may be further exemplified by 3-chloro-1, 2-epoxybutane, 3-bromo-1, 3-epoxyhexane, 3-chloro-1, 2-epoxyoctane, and the like.

Preferred polyepoxides of this type are the glycidyl polyethers of dihydric phenols produced by this method from dihydric phenols and epichlorohydrin. The monomer products of this type may be represented by the general formula:

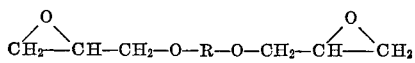

wherein R represents a divalent hydrocarbon radical of the dihydric phenol. The polymeric products will generally not be a single simple molecule but will be a complex mixture of glycidyl polyethers of the general formula:

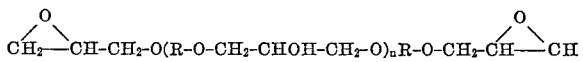

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The aforedescribed glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

These epoxy resins are available in several forms varying from a viscous liquid to a solid resin. Especially suitable are those resins which are liquid or near their softening point at room temperature.

Typical of the epoxy resins which may be employed are the epichlorohydrin-bis-phenol type sold under the trademarks "Epon Resins" (Shell Chemical Corporation), "Gen Epoxy" (General Mills), "DER Resins" (Dow Chemical Corporation), "Araldite" (Ciba), "ERL Resins" (Bakelite Corporation), "Epi-Rez" (Jones Dabney), and "Epiphen" (The Borden Company).

Another group of polyepoxides that may be used comprise the glycidyl ethers of novalac resins, which resins are obtained by condensing an aldehyde with a polyhydric phenol. A typical member of this class is the epoxy resin formed from formaldehyde 2,2-bis(5-hydroxyphenol propane novalac resin which contains as predominant constituent the substance represented by the formula

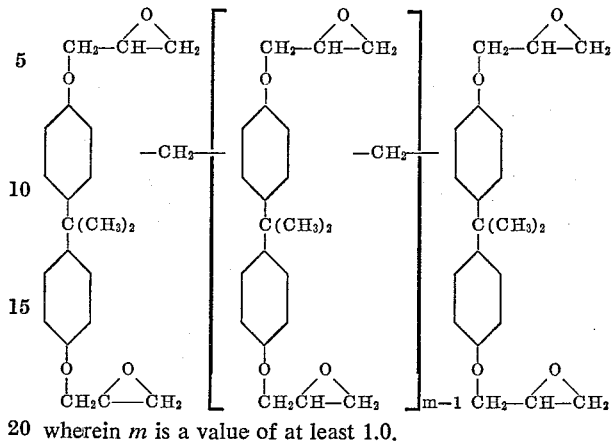

wherein $m$ is a value of at least 1.0.

Another group of polyepoxides include the glycidyl polyethers of a polyhydric phenol which has two hydroxyaryl groups separated by an aliphatic chain of at least six carbons atoms in the chain and with the chain being attached by carbon-to-carbon bonding to a nuclear atom of the hydroxyl aryl groups. Suitable phenols used for preparing these resins comprise those obtained by condensing phenol with a phenol having an aliphatic side chain with one or more olefinic double bonds positioned in the chain so the required separating atoms are present between two hydroxyphenol groups of the resulting polyhydric phenol. Cardanol, obtainable in known manner from cashew nut shell liquid, is a convenient source of phenols containing such side chain.

Examples of the polymeric-type polyepoxides include the polyepoxypolyhydroxy polyethers obtained by reacting preferably in an alkaline medium, a polyhydric alcohol or polyhydric phenol with a polyepoxide, such as the reaction product of glycerol and bis(2,3-epoxypropyl) ether, the reaction product of sorbitol and bis(2,3-epoxy-2-methylpropyl) ether, the reaction product of pentaerythritol and 1,2-epoxy-4,5-epoxypentane, and the reaction product of bis-phenol and bis(2,3-epoxy-2-methylpropyl) ether, the reaction product of resorcinol and bis(2,3-epoxypropyl) ether, and the reaction product of the catechol and bis(2,3-epoxypropyl) ether.

Other polyepoxide compounds include the polymers and copolymers of the epoxy-containing monomers possessing at least one polymerizable ethylenic linkage. When this type of monomer is polymerized in the substantial absence of alkaline or acidic catalysts, such as in the presence of heat, oxygen, peroxy compound, actinic light, and the like, they undergo addition polymerization at the multiple bond leaving the epoxy group unaffected. These monomers may be polymerized with themselves or with other ethylenically unsaturated monomers, such as styrene, vinyl acetate, methacrylonitrile, acrylinitrile, vinyl chloride, vinylidene chloride, methyl acrylate, methyl methacrylate, diallyl phthalate, vinyl allyl phthalate, divinyl adipate, chloroallyl acetate, and vinyl methallyl pimelate. Illustrative examples of these polymers include poly (allyl 2,3-epoxy-propyl ether), poly(2,3-epoxypropyl crotonate), allyl 2,2-epoxypropyl etherstyrene copolymer, methallyl 3,4-epoxybutyl etherallyl benzoate copolymer, poly(vinyl 2,3-epoxypropyl ether), allyl glycidyl ether-vinyl acetate copolymer and poly(4-glycidyloxy-styrene).

Another group of polyepoxides include the epoxy esters of polybasic acids, such as diglycidyl phthalate and diglycidyl adipate, diglycidyl tetrahydrophthalate, diglycidyl maleate, and the like.

Particularly preferred members of the above-described group comprise the polymers of the 2-alkenyl glycidyl ethers having a molecular weight between 300 and 1000 and an epoxy equivalency greater than 1.0 and preferably between 1.2 and 6.0.

Other polyepoxides include the polyepoxy polyethers comprising ethers of epoxy alcohols and polyhydric alcohols such as obtained by reacting, preferably in the presence of an acid-acting compound as hydrofluoric acid, polyhydric alcohols with epichlorohydrin or dichlorohydrins and then dehydrochlorinating the resulting product in the presence of an alkaline component. Examples of polyhydric alcohols that may be used for this purpose include, among others, 1,2,6-hexanetriol, 1,5-pentamediol, butylene glycol, glycerol, sorbitol, mannitol, pentaerythritol, polyallyl alcohol, polyvinyl alcohol, trimethyllolpropane, bis (4-hydroxycyclohexyl) dimethylmethane, 1,4-dimenthylolbenzene, and the like; polyhydric ether alcohols, as triglycerol and dipentaerythritol; polyhydric thioethers, such as 2,2'-dihydroxydiethyl sulfide and 2,2'-2,3'-tetrahydroxy dipropyl sulfide; mercapto alcohols as alpha-monothioglycerol, alpha, alpha'-dithioglycerol; polyhydric alcohol partial esters such as monostearin, pentaerythritol monoacetate and the like; and halogenated polyhydric alcohols as the monochloride of pentaerythritol, monochloride of sorbitol, monochloride of glycerol, and the like.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxy groups. Such products preferably have an epoxy equivalency greater than 1.0, and still more preferably between 1.1 and 4 and a molecular weight between 300 and 1000.

As cross-linking compounds for epoxy resin compositions, aminetype or polyfunctional amines have been found to be particularly useful. By the term "polyfunctional amines" as used herein; is meant organic compounds having at least one nitrogen atom and at least two active amino hydrogen atoms which can be on the same or different nitrogen atoms. Curable mixtures can be formed from epoxy resin compositions and polyfunctional amines at temperatures in the 20° C. to 30° C. range, and higher, if desired. Temperatures above 20° C. can be used when higher curing rates are desired or for any other purpose. Temperatures above 250° C., however, are not preferred.

These curable mixtures therefore are particularly useful for applications wherein high temperatures cannot be employed in curing.

Typical polyfunctional amines include the aliphatic primary amines, such as ethylamine, isopropylamine, n-butylamine, isobutylamine, 2-ethylhexylamine, monoethanolamine, monoisopropanolamine, beta alanine, cyclohexylamine, amides, e.g., formamide, acetamide propionamide, n-butyramide, stearamide, and the like; aromatic primary amines, such as asaniline, alpha-methylbenzylamine; and the like, heterocyclic primary amines, such as N-aminoethyl morpholine, N-aminopropyl morpholine; the aliphatic polyamines, such as ethylenediamine, diethylenetriamine, triethylenetetramine, tetraethylenepentamine, polyethylenepolyamines, propylenediamine, dipropylenetriamine, polypropylenepolyamines, butylenediamines, pentylenediamines, hexylenediamines, octylenediamines, nonoylenediamines, decylenediamines, dimethylurea, 1,3 - diamino - 2 - propanol, 3,3'-imino-bis-(propylamine), guanidine, and the like; aromatic polyamines, such as meta-ortho-and para-phenylenediamines, 1,4-naphthalenediamine, 1,4 - anthradiamine, 3,3' - biphenyldiamine, xylylenediamine, 3,4-biphenylamine, 3,4-toluenediamine, alpha, alpha' - biparatoluidene, para,para'-methylenedianiline, 1-methoxy-6-methylmeta-phenylenediamine, para,para'-sulfonyldiamine, and the like; and heterocyclic polyamines, such as piperazine, 2,5-dimethylpiperazine, melamine, 2,4 - diamine - 5 - (amino-methyl) pyrididine, 2,4,6-triaminopyrimidine, 3,9-bis (aminoethyl) apirobi-metadioxane, and the like.

Other polyfunctional amines include the low molecular weight polyamides, which are condensation products of polycarboxylic acids, in particular, hydrocarbon dicarboxylic acids, with polyamines, particularly, diamines, such as those monomeric diamines previously listed. Typical polyamides are prepared in accordance with known condensation procedures from adipic acid and hexamethylene diamine, dilinoleic acid and ethylenediamine, terephthalic acid and diethylenetriamine and the like.

Amido-amines produced by the reaction of polyamines of the type described with monocarboxylic acids or mixtures of monocarboxylic and polycarboxylic acids wherein a stoichiometric excess of the polyamine is used are suitable hardeners. Particularly suitable and preferred are those amido amines having amine numbers in excess of 400 (equivalent weight of 145 or less).

Still other illustrations of polyfunctional amines are the addition products or adducts, of polyamines, in particular diamines and triamines, and low molecular weight epoxides containing oxirane oxygen linked to vicinal carbon atoms, such as ethylene oxide, propylene oxide, butadiene dioxide, diglycidyl ether, epoxidized soy-bean oil, epoxidized safflower oil, and the like, and polyglycidyl polyethers of polyhydric phenols. Particularly useful polyfunctional amines are the mono- and polyhydroxyalkyl polyalkylene polyamines which can be prepared by the addition reaction of polyalkylene polyamines, preferably ethylenediamine, propylenediamine, diethylenetriamine, dipropylenetriamine or triethylenetetramine and the like, with ethylene oxide or propylene oxide. This reaction can be conducted under pressure at temperatures of 50° C. or 55° C. to boiling in the absence of solvents or in the presence of water or an alcohol. However, the reaction is more advantageously carried out at temperatures below 40° C. and preferably below 35° C. without pressure. The amines so produced include N-hydroxyethylethylenediamine, N,N'-bis(hydroxyethyl) ethylenediamine, N-bis(hydroxyethyl) diethylenetriamine, N,N-bis(hydroxyethyl) diethylenetriamine, N,N''-bis(hydroxyethyl) diethylenetriamine, N-hydroxypropyldiethyl-enetriamine, N,N - bis(hydroxypropyl) diethylenetriamine, N,N'' - bis(hydroxypropyl) diethylenetriamine, N-hydroxyethylpropylenediamine, N-hydroxypropylpropylenediamine, N - hydroxyethyldipropylenetriamine, N,N - bis (hydroxyethyl) dipropylenetriamine, N,N - bis(hydroxyethyl) dipropylenetriamine, tris(hydroxyethyl) triethylenetetramine and the like. Other particularly useful epoxide-polyamine adducts can be prepared with known procedures by the addition reaction of polyglycidyl polyethers of dihydric phenols and the polyamines, in particular, polyalkylene polyamines. Of particular importance in forming these epoxide polyamine adducts are the diglycidyl diethers of dihydric phenols, such as, for example, the isomers of dihydroxydiphenylmethanes singularly or mixed and the dihydroxydiphenyldimethylpropanes singularly or mixed. Mixtures of diglycidyl polyethers of dihydric phenols containing a predominance of diglycidyl diethers of dihydric phenols can be prepared by reacting epichlorohydrin with a dihydric phenol using a molar excess of epichlorohydrin over the theoretical molar requirement. Substantially pure cuts of the diglycidyl diethers then can be obtained by fractional distillation under reduced pressure, for example. Illustratively, the polyfunctional amine or epoxide-polyamine adduct itself can be prepared by mixing the diglycidyl polyether of a dihydric phenol with a polyalkylene diamine such as diethylenetriamine, dipropylenetriamine and the like, and bringing to an elevated temperature up to about 200° C. and maintaining at such an elevated temperature for a period of from 4 to 5 hours. Alternatively, as an illustration, polyfunctional amines or epoxide polyamine adducts can be prepared by adding a diglycidyl diether of a dihydric phenol to a polyalkylene polyamine over a period of time, around three to four hours, while maintaining the reaction mixture at an elevated temperature, for example, up to about 200° C. and subsequently adding a dihydric phenol.

Additional polyfunctional amines include the low molecular weight addition products of a polyamine, preferably a polyalkylene polyamine such as those listed above and a vinyl group-containing compound. Typical vinyl group-containing compounds, are, for example, ethylene, propylene, 1-butene, isobutene, acrolein, vinyl chloride, vinylidene chloride, vinyl acetate, acrylonitrile, styrene and the like. The polyfunctional amines or vinyl polyamide adducts can be prepared in accordance with known procedures by reacting a polyamine and a vinyl group-containing compound in various proportions at a temperature in the range from 20° C. to 100° C. and removing unreacted materials and low boiling material by vacuum distillation.

Other polyfunctional amines having a total of at least two active amino hydrogen atoms to the molecule can be advantageously employed in the epoxide compositions of this invention. For example, such polyfunctional amines as mixtures of para,para'-methylenedianiline and metaphenylenediamine or other mixtures of two or more polyfunctional amines can be used. Particularly valuable resins made in accordance with this invention are obtainable from our epoxide compositions and polyfunctional amines as described above which have melting points or melting point ranges below about 150° C.

In making the epoxy resin compositions of this invention, if desired, the epoxy resins can be compounded with other resins, such as polystyrene resins, polyester resins, and so forth, to increase the flexibility of the hardened composition or for any other purpose.

Various types of inert pigments and fillers may also be incorporated into the epoxy compositions. As examples of such fillers may be mentioned blanc fixe, talc, pyrophyllite, diatomaeceous earth, silica aerogel, finely divided sand and other like inert materials. The fillers are preferably in a fine state of subdivision and have high surface areas.

Color materials may be added to the compositions if desired. The coloring materials include organic and inorganic coloring materials. As examples may be mentioned titanium dioxide and carbon black. Coloring materials should be selected, however, so as to be non-reactive with the epoxy resins and other ingredients at atmospheric temperature, as otherwise this might cause poor storage stability and also affect retention of adhesiveness.

The composition of the present invention may also have incorporated therein, if desired, a lubricant, such as silicone oils, silicone jelly, petroleum jellies and so forth. As an example of the silicone oil may be mentioned organosiloxane liquid supplied as Silicone Liquid No. 81069. Any of the commercially available silicone jellies which are sold under a wide variety of trademarks and tradenames may be used.

In forming the epoxy resin compositions of the invention, enough of the hardeners disclosed herein are admixed with the epoxy resin to insure that good hardening of the resin is achieved. The amount of the amine-type curing agent to be used will vary over a wide range. Good cures are obtained by reacting the polyepoxide with at least .8 equivalent of the amine-type curing agent. As used herein relative to the amount of the amine-type curing agent, the expression "equivalent amount" refers to that amount of the agent needed to furnish one amino-substituted hydrogen atom for every epoxy group in the polyepoxide to be involved in the cure. To obtain the best results, the amine-type curing agent should be employed in about at least a chemical equivalent amount, and more preferably in equivalent ratio of 1:1 to 1.5:1.

The manner in which the present invention may be practiced will be clear from the following examples which are to be considered illustrative rather than limiting.

Example 1

This example illustrates the improvement in organic acid resistance afforded to a polyepoxide resin composition hardened at room temperature by an amido-amine curing agent when sodium montmorillonite mineral is incorporated in the composition.

The following epoxy resin composition was prepared using the proportions of ingredients noted:

|  | Percent |
|---|---|
| Epoxy resin | 15.0 |
| Polystyrene resin | 6.2 |
| Petroleum jelly | .7 |
| Phenyl glycidyl ether | 1.4 |
| Bisphenol A | .3 |
| Silica (50 mesh) | 65.0 |
| Amido-amine curing agent | 8.9 |
| Diethylene triamine | .3 |
| Carbon | .1 |
| Silica aerogel | 2.1 |
|  | 100.0 |

The epoxy resin used in this example was a liquid having a viscosity of 100–160 poises at 25° C. and an epoxide equivalent weight of 180–195. It was purchased under the trade name "Epon 828". Epon 828 is a liquid epoxy resin having a viscosity at 25° C. of 100–160 poises, and an epoxide equivalent weight of 180–195. The amido-amine curing agent used in this example had an equivalent weight of 135 and was purchased under the trade name "EM-308". EM-308 is a polyamido amine which is the condensation product of tetraethylene pentamine and tall oil. It has an amine value of 410–450 and a viscosity of 2–5 poises at 25° C.

A white, high gel, bentonite clay was used in this example. The clay was a sodium bentonite of the swelling, Western type containing approximately 80–85% sodium montmorillonite mineral, pH at 10% solids of 9 to 10. It was purchased under the trade name "Bentolite H".

The above-described montmorillonite mineral containing bentonite clay and epoxy resin composition were used to prepare the following compositions:

(A)

|  | Weight parts |
|---|---|
| Epoxy resin comopsition | 100 |
| Sodium bentonite | 5 |

(B)

|  |  |
|---|---|
| Epoxy resin composition | 100 |
| Sodium bentonite | 10 |

Composition A contained approximately 4 weight parts of sodium montmorillonite mineral for each 15 weight parts of epoxy resin and composition B contained approximately 8 weight parts of sodium montmorillonite mineral for each 15 weight parts of epoxy resin.

After thorough mixing, 1″ x 1″ cylinders were cast from compositions A and B as well as from the epoxy resin composition used in the preparation of A and B. All cylinders were allowed to cure for 14 days at room temperature. Each of the cured cylinders were then weighed and samples of each composition were immersed in separate containers holding the following solutions: 10% acetic acid, 30% acetic acid, and 20% lactic acid.

After immersing in the above-described solutions for 28 days at room temperature the test samples were removed, washed with water, and then re-weighed and the following results were recorded:

| | Weight Change after 28 Day Immersion (percent) | | Epoxy Resin Composition |
|---|---|---|---|
| | Composition A | Composition B | |
| 10% acetic acid | +6.4 | +7.4 | +18.7% (sample swollen). |
| 30% acetic acid | +17.2 | +15.9 | Swelled and ruptured—no measurement possible. |
| 20% lactic acid | +9.0 | +6.6 | Do. |

All samples of compositions A and B were intact with no sign of swelling or rupture observed.

Example 2

An epoxy resin composition prepared as in Example 1 was used in this example.

Ten weight parts of the sodium montmorillonite containing clay described in Example 1 were added to and thoroughly mixed with 100 weight parts of the epoxy resin composition thereby giving a composition containing approximately 8 weight parts of sodium montmorillonite mineral to 15 weight parts of epoxy resin.

The epoxy resin composition and the montmorillonite modified compositions were then cast into 1" x 1" cylinders and allowed to cure for 14 days at room temperature.

Cured cylinders from each of the compositions were placed in Erlenmeyer flasks containing 50% acetic acid. The flasks were fitted with reflux condensers and the acetic acid was then brought to its boiling temperature and maintained at that temperature for one and one-half hours.

While immersed in the boiling acetic acid the cured, unmodified epoxy resin cylinders were observed to swell and rupture eventually flaking where as the montmorillonite containing polyepoxide samples exhibited no swelling, rupturing or flaking during the entire period of the test.

Example 3

This example illustrates the use of various different montmorillonite containing clays in preparing polyepoxide resin compositions that are resistant to attack by organic acids.

The epoxy resin composition described in Example 1 was used in this example.

The following compositions were prepared:

(A)

| | Weight parts |
|---|---|
| Epoxy resin composition | 100 |
| Montmorillonite-containing clay | 10 |

A high gelling grade of white Italian bentonite clay of the sodium montmorillonite type was used in this composition. The clay had a swelling power to 41 cc. in water, a pH of 10 and contained 85% montmorillonite mineral.

(B)

| | Weight parts |
|---|---|
| Epoxy resin composition | 100 |
| Bentonite | 10 |

A low gelling, white, Italian bentonite clay of the calcium montmorillonite type was used in this composition. The clay contained 85% montmorillonite mineral.

(C)

| | Weight parts |
|---|---|
| Epoxy resin composition | 100 |
| Bentonite | 10 |

A coarse, white, non-swelling magnesium montmorillonite containing bentonite clay from the Colorado-Nevada area was used in this composition. The clay was refined to remove foreign materials and contained about 80% montmorillonite mineral.

(D)

| | Weight parts |
|---|---|
| Epoxy resin composition | 100 |
| Bentonite | 10 |

The bentonite used here was a crude magnesium montmorillonite containing clay from which the bentonite of Composition C was derived.

(E)

| | Weight parts |
|---|---|
| Epoxy resin composition | 100 |
| Bentonite | 10 |

The bentonite used for this composition was the swelling type containing 85% sodium montmorillonite. The montmorillonite used in this composition has a pH of 8.8 when in a 6% water suspension.

(F)

| | Weight parts |
|---|---|
| Epoxy resin composition | 100 |
| Bentonite | 10 |

The bentonite used in this composition was of the high purity swelling type containing unadulterated sodium montmorillonite.

(G)

| | Weight parts |
|---|---|
| Epoxy resin composition | 100 |
| Bentonite | 10 |

The bentonite clay used in this composition was a high colloidal western type containing a high percentage of sodium montmorillonite.

(H)

Epoxy resin composition:

Compositions A-H were cast into 1" x 1" cylinders and were cured for 7 days at room temperature and 24 hours at 80° C.

The cured cylinders were then weighed and immersed in 30% acetic acid solutions. After 14 days at room temperature the samples were dried and re-weighed and the following changes in weight were measured.

| | Percent |
|---|---|
| Composition A | +5.7 |
| Composition B | +6.7 |
| Composition C | +6.5 |
| Composition D | +4.2 |
| Composition E | +7.2 |
| Composition F | +6.9 |
| Composition G | +7.8 |
| Composition H | Disintegrated |

Example 4

This example illustrates the use of various cation-containing clay minerals exhibiting base-exchange capabilities of at least 20 in preparing polyepoxide resin compositions that are resistant to attack by organic acids.

The epoxy resin composition of Example 1 was used in this example.

The following compositions were prepared:

(A)

| | Weight parts |
|---|---|
| Epoxy resin composition | 100 |
| Vermiculite clay mineral | 10 |

An expanded grade of vermiculite ground to a fine particle size was used in this composition.

(B)

| | Weight parts |
|---|---|
| Epoxy resin composition | 100 |
| Attapulgite | 10 |

The attapulgite mineral used in this composition was a needle-like particle averaging 0.12 micron in size having pH of 7.5–9.0 and a surface area of 200–220 sq.m./ gms. It was purchased under the trade name "Attagel 30."

(C)

| | Weight parts |
|---|---|
| Epoxy resin composition | 100 |
| Attapulgite | 10 |

The attapulgite mineral used in this composition was a processed attapulgite consisting essentially of stacks of colloidal needle-like particles and purchased under the trade name "Corragel."

(D)

Epoxy resin composition:

Compositions A to D were cast into 1" x 1" cylinders and cured 7 days at room temperature.

The cured cylinders were then weighed, immersed in 50% acetic acid solutions and boiled for 1 hour. The samples prepared from Composition D disintegrated within 30 minutes. The samples prepared from Compositions A to C were removed from the acid solutions after 1 hour, allowed to cool, washed, dried and re-weighed. No deterioration was observed for any of the samples prepared from Compositions A to C and the following weight changes were measured:

| | Percent |
|---|---|
| Composition A | +3.3 |
| Composition B | +6.6 |
| Composition C | +5.8 |

Example 5

This example illustrates the use of montmorillonite minerals as an additive for various types of epoxy resin compositions which have been prepared at some earlier date. The epoxy resin compositions used in this example were commercial products which employed different amine-type curing agents. The montmorillonite mineral described in Example 1 and purchased under the trade name "Bentolite H" was used in this example to prepare the following compositions:

(A)

Epoxy resin portion: Weight parts
(Commercial Product A) _____ 100
Sodium montmorillonite _____ 10

Commercial Product A employed an aliphatic polyamine curing agent that is absorbed on a zeolite powder. Water was used to activate the curing reaction at room temperature.

(B)

Epoxy resin portion: Weight parts
(Commercial Product B) _____ 100
Sodium montmorillonite _____ 10

Commercial Product B employed a polyamide curing agent that was added to the epoxy resin portion for hardening at room temperature.

(C)

Epoxy resin portion: Weight parts
(Commercial Product C) _____ 100
Sodium montmorillonite _____ 10

Commercial Product C employed an amido-amine-aliphatic amine curing agent that was added to the epoxy resin portion for hardening at room temperature.

(D)

Epoxy resin portion: Weight parts
(Commercial Product D) _____ 100
Sodium montmorillonite _____ 10

Commercial Product D employed an amino-amine-polysulfide curing agent that was added to the epoxy resin portion for hardening at room temperature.

(E)

Epoxy resin portion: Weight parts
(Commercial Product E) _____ 100
Sodium montmorillonite _____ 10

Commercial Product E employed an aliphatic polyamine curing agent that was added to the epoxy resin portion for hardening at room temperature.

The proportions of curing agent activator or curing agent employed in the preparation of each of the above compositions was as directed by the manufacturer. A series of 1" x 1" cylinders were cast from compositions A–E. Another series of 1" x 1" cylinders was cast using each of the above described commercial products prepared as directed by the manufacturer but to which no montmorillonite mineral was added.

The cylinders cast from compositions A–E and the corresponding compositions which did not contain the montmorillonite mineral were allowed to cure for 14 days at room temperature. The cylinders were then weighed and immersed in 30% acetic acid solutions for 14 days. After 14 days immersion, the samples were removed from the acetic acid solution, washed with water and re-weighed. The observed condition of the samples and the measured weight changes are tabulated in the following table:

| | Weight Change, Percent | Sample Condition |
|---|---|---|
| Commercial Product A | +19 | Sample ruptured and soft. Some increase in volume. |
| Composition A | +9 | No change in condition or appearance. |
| Commercial Product B | +10 | Surface softened and ruptured. |
| Composition B | +4 | No change in condition or appearance. |
| Commercial Product C | +26 | Sample softened and ruptured. |
| Composition C | +7 | No change in condition or appearance. |
| Commercial Product D | +11 | Sample softened and ruptured. |
| Composition D | +7 | No change in condition or appearance. |
| Commercial Product E | +4 | Sample ruptured. |
| Composition E | +5 | No change in appearance. |

Example 6

This example illustrates the resistance to attack by various organic and mineral acids of epoxy resin compositions containing montmorillonite minerals. The epoxy resin composition of Example 1 was used in this example.

The following compositions were prepared:

(A)

| | Weight parts |
|---|---|
| Epoxy resin composition | 100 |
| Sodium bentonite | 15 |

(B)

| | |
|---|---|
| Epoxy resin composition | 100 |
| Sodium bentonite | 20 |

(C)

| | |
|---|---|
| Epoxy resin composition | 100 |
| Calcium bentonite | 15 |

(D)

| | |
|---|---|
| Epoxy resin composition | 100 |
| Calcium bentonite | 20 |

The sodium bentonite used in this example was the sodium montmorillonite containing bentonite clay described in Example 1. The calcium bentonite was a white, low gel bentonite having a pH at 10% solids of 6.8–7.0, and consisting of about 80–85% calcium montmorillonite mineral. The calcium bentonite was purchased under the trade name "Bentolite L."

1" x 1" cylinders were cast from compositions A–D and these were then allowed to cure for 28 days at room temperature. After curing, samples of each composition were weighed and immersed in the following solutions: 10% hydrochloric acid, 10% nitric acid, 10% sulfuric acid, 30% acetic acid, 30% lactic acid, 30% citric acid, 30% chloroacetic acid, and 30% formic acid. After immersion for 34 days the samples were removed from the test solutions, washed and re-weighed. The weight changes determined are tabulated below.

| Reagent | Comp. A, Percent | Comp. B, Percent | Comp. C, Percent | Comp. D, Percent |
|---|---|---|---|---|
| 10% HCl | +1.9 | +2.8 | +3.0 | 0.0 |
| 10% HNO³ | +5.0 | +3.7 | +2.5 | +1.4 |
| 10% H²SO⁴ | +2.0 | +6.5 | +1.0 | +4.5 |
| 30% Acetic Acid | +14.9 | +4.6 | +11.8 | +7.7 |
| 30% Lactic Acid | +7.5 | +15.2 | +4.5 | +4.5 |
| 30% Citric Acid | +2.0 | +3.6 | +4.9 | +0.0 |

All cylinders exposed during the test were visually inspected and no notable deterioration such as blistering, swelling, rupturing or unusual softening was found.

Example 7

This example illustrates that elevated temperature curing of expoxy resin compositions employing amine curing agents does not affect the organic acid resistance afforded by incorporation of cation containing clay minerals in the composition. The following compositions were prepared:

(A)

| | Weight parts |
|---|---|
| Epoxy resin ("Epon 828") | 100 |
| Amido amine ("EM-308") | 50 |
| Silica | 300 |

(B)

| | |
|---|---|
| Epoxy resin ("Epon 828") | 100 |
| Amido amine ("EM-308") | 50 |
| Silica | 300 |
| Sodium bentonite | 100 |

The sodium bentonite used in this composition was a high gelling grade of white Italian bentonite containing about 85% sodium montmorillonite and having a swelling power to 44 cc. in water and a pH of 10. It was purchased under the trade name "Whittaker 2273."

(C)

| | Weight parts |
|---|---|
| Epoxy resin | 100 |
| Phenyl glycidyl ether | 10 |
| "Epicure 874" | 11 |
| Sand | 200 |

(D)

| | |
|---|---|
| Epoxy resin | 100 |
| Phenyl glycidyl ether | 10 |
| "Epicure 874" | 11 |
| Sand | 200 |
| Sodium bentonite | 66 |

The epoxy resin used in compositions C and D was a liquid resin having an epoxide equivalent weight of 235–255, a viscosity of 100,000 cps., purchased under the trade name "Epirez 514." Epirez 514 is a standard bisphenol A resin having an epoxide equivalent weight of 235–255. "Epicure 874" is the trade name of an amine type curing agent with an equivalent weight of about 40 and a viscosity of 100–200 cps. at 25° C. The sodium bentonite used in Composition D contained 85% sodium montmorillonite mineral and was purchased under the trade name "Baroid BL–46".

(E)

| | Weight parts |
|---|---|
| Epoxy resin | 100 |
| Triethylyenetetramine | 10 |
| Sand | 300 |

(F)

| | |
|---|---|
| Epoxy resin | 100 |
| Triethylyenetetramine | 10 |
| Sand | 300 |
| Sodium bentonite ("Baroid BL–46") | 66 |

The epoxy resin used in preparing compositions E and F was a low viscosity modified resin having an epoxy value, Eq./100 grams of 0.39, a viscosity of 500 cps. at 25° C. and purchased under the trade name "DP–312."

(G)

| | Weight parts |
|---|---|
| Epoxy resin composition | 100 |

(H)

| | |
|---|---|
| Epoxy resin composition | 100 |
| Attapulgite | 10 |

(I)

| | |
|---|---|
| Epoxy resin composition | 100 |
| Attapulgite | 10 |

(J)

| | |
|---|---|
| Epoxy resin composition | 100 |
| Attapulgite | 10 |

The epoxy resin composition of Example 1 was used in preparing Compositions G to J of this example.

The attapulgite mineral used in Composition H was a needle-like particle averaging 0.14 micron in size, having a pH of 7.5–9.0 and an average surface area of 200–220 sq. m./gm. It was purchased under the trade name "Attagel 20."

The attapulgite mineral used in Composition I was a needle-like particle averaging 0.12 micron in size and having a pH of 7.5–9.0 and a surface area of 200–220 sq. m./gm. It was purchased under the trade name "Attagel 30."

The attapulgite mineral used in Composition J was a processed attapulgite consisting essentially of stacks of colloidal needle-like particles purchased under the trade name "Corragel."

Compositions A–J were cast into 1" x 1" cylinders and 1" x 1" x ¼" strips and then cured 24 hours at 80° C. After cooling 24 hours at room temperature, cylinder and strip samples of each composition were immersed in a 50% acetic acid solution and boiled for 1 hour. After the period of immersion it was observed that the samples prepared from compositions A, C, E, and G had disintegrated whereas samples prepared from compositions B, D, F, H, I, and J exhibited no signs of deterioration.

Example 8

The epoxy resin composition of Example 1 and the calcium montmorillonite containing bentonite clay described in Example 5 were used in this example.

For each 100 weight parts of the epoxy resin composition the following amounts of calcium bentonite were added in preparing the compositions of this example.

(A)

| | Weight parts |
|---|---|
| Calcium bentonite | 1 |

(B)

| | |
|---|---|
| Calcium bentonite | 2 |

(C)

| | |
|---|---|
| Calcium bentonite | 3 |

(D)

| | |
|---|---|
| Calcium bentonite | 5 |

(E)

| | |
|---|---|
| Calcium bentonite | 7.5 |

(F)

| | |
|---|---|
| Calcium bentonite | 10 |

(G)

No additive

1" x 1" cylinders were cast from compositions A–G which were allowed to cure for 14 days at room temperature. The cured samples were weighed and then immersed in a 30% acetic acid solution. After 7 days immersion composition G samples were found to be severely deteriorated. Compositions A, B and C samples were swollen and ruptured around the ends with some flaking also noted. A 14.4% weight increase was determined for the composition C samples. The composition D, E and F samples were found to be in good condition with no swelling or rupturing observed. Weight increases of +7.6%, 6.1% and 5.5% were measured on compositions D, E and F samples respectively.

Example 9

The epoxy resin composition of Example 1 was used in this example.

For each 100 weight parts of the epoxy resin composition the following amounts of attapulgite minerals were added to prepare the compositions of this example.

|  | Weight parts |
|---|---|
| (A) | |
| Attapulgite | 2 |
| (B) | |
| Attapulgite | 5 |
| (C) | |
| Attapulgite | 7.5 |
| (D) | |
| Attapulgite | 10 |
| (E) | |
| No additive | |

The attapulgite mineral used in Compositions A to D were needle shaped particles averaging 5.3 micron size having a pH of 7.5–9.0 and a cation exchange capacity of approximately 20–25. It was purchased under the trade name "Attacote."

1″ x 1″ cylinders were cast from Compositions A to E which were cured 16 hours at 80° C. The cured samples were immersed in 50% acetic acid solutions and boiled for 1 hour.

Samples prepared from Composition E disintegrated within a short time. Samples prepared from Compositions A to D were removed from the acid solution after boiling 1 hour, cooled, washed and dried. Samples prepared from Compositions A and B were observed to have some edge rupturing and fraying and were swollen slightly. Samples prepared from Compositions C and D were observed to be in excellent condition.

A similar series of samples were prepared using an attapulgite mineral purchased under the trade name "Attasorb LVM". The minerals had needle shaped particles having an average size of 2.9 microns, a pH of 7.5–9.0 and a cation-exchange capacity of approximately 25–30. The portions of mineral added were the same as used in preparing Compositions A to E. The test samples were prepared as above and the observed test results were similar to those observed for the compositions prepared above with the attapulgite mineral purchased under the trade name "attacote".

Example 10

This example illustrates the preparation of a two-portion, room temperature curing, organic acid resistant epoxy resin composition wherein the montmorillonite mineral is incorporated as part of the hardener portion.

Resin portion:

|  | Grams |
|---|---|
| Epoxy resin (Epon 828") | 62 |
| Polystyrene resin | 28 |
| Phenyl glycidyl ether | 6 |
| Bisphenol A | 1.3 |
| Petroleum jelly | 5.0 |
| | 102.3 |

Hardener portion:

|  | Grams |
|---|---|
| Amido-Amine ("EM–308") | 37.3 |
| Diethylene triamine | 1.7 |
| Sodium bentonite | 95.0 |
| | 134.0 |

The resin and hardener portions described above were thoroughlly mixed together and 1″ x 1″ cylinders were cast. After curing 14 days at room temperature the cylinder samples were weighed and immersed in a 30% acetic acid solution.

The samples were removed from the acetic acid after 7 days exposure, washed and re-weighed. There was no deterioration found and a weight increase of 5% was measured.

Example 11

This example illustrates the improvement in organic acid resistance afforded by the incorporation of montmorillonite minerals in room temperature cured polyepoxide compositions prepared from various epoxy resin-polyamine systems.

The following compositions were used in this example:

(A)

|  | Weight parts |
|---|---|
| Epoxy resin | 50 |
| Triethylenetetramine | 6 |
| 50 mesh silica | 196 |

(B)

|  | |
|---|---|
| Epoxy resin | 50 |
| Triethylenetetramine | 6 |
| 50 mesh silica | 196 |
| Sodium bentonite | 25.2 |

The epoxy resin used in compositions A and B was a liquid having an equivalent weight of 180–200, a viscosity of 100–160 poises and was purchased under the trade name "Epirez 510." Epirez 510 is a standard bisphenol A resin having an epoxide equivalent weight of 180–200.

The sodium bentonite used contained 85% sodium montmorillonite, 75–90% passing through a 200 mesh screen, and was obtained under the trade name "Volclay Premium Gel Bentonite."

(C)

|  | Weight parts |
|---|---|
| Epoxy resin | 50 |
| Amino-amine curing agent | 17.5 |
| 50 mesh silica | 236.2 |

(D)

|  | |
|---|---|
| Epoxy resin | 50 |
| Amino-amine curing agent | 17.5 |
| 50 mesh silica | 236.2 |
| Sodium bentonite | 30.3 |

The epoxy resin used in compositions C and D was the same liquid resin used in compositions A and B. The amido-amine curing agent used in compositions C and D was a modified amido-amine having an equivalent weight of approximately 65, a viscosity of 50–900 cps. and was purchased under the trade name "Epicure 872." The same montmorillonite containing clay was used as in composition B.

(E)

|  | Weight parts |
|---|---|
| Epoxy resin | 50 |
| Amino-amine curing agent | 25 |
| Sand | 262.5 |

(F)

|  | |
|---|---|
| Epoxy resin | 50 |
| Amino-amine curing agent | 25 |
| Sand | 262.5 |
| Sodium bentonite | 33.7 |

The epoxy resin used in compositions E and F was the same liquid resin used in compositions A, B, C, D. The same montmorillonite containing bentonite was used as in compositions B and D. The curing agent used in compositions E and F was an amido-amine type having an amine number of about 450–500, equivalent weight about 100, a viscosity of 150–400 cps. at 77° F., and was purchased under the trade name "Epicure 855."

(G)

| | Weight parts |
|---|---|
| Epoxy resin | 50 |
| Curing agent | 17.5 |
| Sand | 236.2 |

(H)

| | |
|---|---|
| Epoxy resin | 50 |
| Curing agent | 17.5 |
| Sand | 236.2 |
| Sodium bentonite | 30.3 |

The epoxy resin used in compositions G and H was a diluent containing liquid epoxy resin having a very low viscosity and was purchased under the trade name "Epirez 5085." Epirez 5085 is a standard bisphenol A type epoxy resin containing a minor amount of diluent such as butyl glycidyl either or phenyl glycidyl ether for purposes of reducing viscosity. The curing agent used was the same modified amido-amine ("Epicure 872") used and described above in compositions C and D. The sodium bentonite is the same as used in the previous compositions of this example.

(I)

| | Weight parts |
|---|---|
| Epoxy resin "Epirez 5085" | 50 |
| Curing agent | 25 |
| Sand | 262.5 |

(J)

| | |
|---|---|
| Epoxy resin "Epirez 5085" | 50 |
| Curing agent | 25 |
| Sand | 236.2 |
| Sodium bentonite | 33.7 |

The epoxy resin and sodium bentonite were used and described above. The curing agent was the amido-amine type purchased under the trade name "Epicure 855" and described above.

(K)

| | Weight parts |
|---|---|
| Epoxy resin | 50 |
| Polystyrene resin | 21 |
| Phenyl glycidyl ether | 5 |
| Bisphenol A | 1.1 |
| Petroleum jelly | 4 |
| Amido-amine curing agent | 30.9 |
| Sand | 210 |
| Silica aerogel | 3.2 |

(L)

| | |
|---|---|
| Epoxy resin | 50 |
| Polystyrene resin | 21 |
| Phenyl glycidyl ether | 5 |
| Bisphenol A | 1.1 |
| Petroleum jelly | 4 |
| Amido-amine curing agent | 30.9 |
| Sand | 210 |
| Silica aerogel | 3.2 |
| Sodium bentonite | 32.5 |

The epoxy resin used in compositions K and L was "Epirez 510" and described above. The sodium bentonite of Example 1 was used in composition L. The amido-amine curing agent used in compositions K and L had an amine value of 440, equivalent weight of 127, viscosity of 100–600 cps. and was purchased under the trade name "ZL-555."

Compositions A–L were used to prepare 1" x 1" cylinder samples that were cured for 14 days at room temperature. Samples of each composition were then immersed in 30% acetic acid solutions. Samples prepared from compositions A, C, E, G, I, and K were all found to have disintegrated in less than 14 days of immersion at room temperature whereas no visible attack was observed after 28 days immersion at room temperature on samples prepared from composition B, D, F, H, J, and L.

Example 12

This example illustrates the use of an ammonium montmorillonite containing bentonite in preparing an amine cured polyepoxide resin having organic acid resistance.

The epoxy resin composition of Example 1 was used in this example. To 100 weight parts of the epoxy resin composition was added 10 weight parts of an ammonium montmorillonite containing bentonite clay. The ammonium bentonite purchased under the trade name "SFS–100" was a white, non-swelling powder, 98% of which passed through a 200 mesh screen, having a pH of 8.5 and containing 80–85 percent montmorillonite mineral.

The composition prepared above was used to cast 1" x 1" cylinders which were then cured 14 days at room temperature. After curing, ⅛"–3/16" thick discs were cut from some cylinder samples and these discs along with the remaining cylinder samples were immersed in a solution of 30 percent acetic acid. After 28 days immersion the samples were observed to be in excellent condition and an average weight change of 49% was determined.

Example 13

This example illustrates that thin sections of cured polyepoxide resin compositions with surface skin removed have improved resistance to organic acids when a montmorillonite mineral was incorporated in the curable composition.

The following compositions were prepared:

(A) The epoxy resin of Example 1 was used in this example.

(B) The epoxy resin composition and the sodium montmorillonite containing clay of Example 1 were used in preparing this composition according to the following proportions:

| | Weight parts |
|---|---|
| Epoxy resin composition | 100 |
| Sodium bentonite | 10 |

(C) The epoxy resin composition described in Composition K (epoxy resin "Epirez 510") of Example 11 was used in this example.

(D) The epoxy resin composition described in Composition K (epoxy resin "Epirez 510") of Example 11 was used in this example and was mixed with the sodium bentonite described in Example 1 in the following proportions:

| | Weight parts |
|---|---|
| Epoxy resin composition (15% "Epirez 510") | 100 |
| Sodium bentonite | 10 |

Compositions A–D were cast in 1" x 1" cylinders and cured for 14 days at room temperature. ⅛" to 3/16" discs were cut from the cured 1" x 1" cylinders of each composition.

Sample cylinders and discs were then immersed in 50% acetic acid solutions which were then boiled for 1 hour. Cylinder and disc samples of compositions A and C were observed to have disintegrated within 15 minutes after the acetic acid was brought to a boil whereas samples prepared from compositions B and D were visually unaffected after immersion for 1 hour in boiling acetic acid. An average weight change of +7% for composition B samples and +16% for composition D samples was measured.

The compositions of the invention comprise bringing together a hardenable epoxy resin composition, i.e., an epoxy resin and an epoxy resin curing agent and at least about 15% by weight and preferably at least about 50% by weight based on the weight of the epoxy resin of a clay mineral that exhibits a base exchange capacity of at least about 20 milliequivalents of exchangeable base per 100 grams of clay and containing cations such as alkali and alkaline-earth metals, ammonium including mixtures thereof. The typical working range for good resistance to hot organic acids will be between about 50% and 125% by weight of the clay mineral based on the weight of epoxy resin in the composition.

It will be clear from the foregoing that the epoxy resin compositions of this invention may take the form of one-part or multi-part systems.

In the one-part systems, the epoxy resin and a stable form of the hardener are intimately admixed and, for cure, a suitable activating agent, such as water, is added to release the hardener which is then free to enter into a crosslinking reaction with the epoxy resin.

In multi-part systems, the epoxy resin and hardener portions are packaged separately, and admixed only when cure of the resin is desired. In some multi-component systems, fillers and other additives are also packaged separately.

The epoxy resins and/or hardeners may be liquids or free flowing powders. When either the resin or hardener is a liquid, and free flowing powder compositions are desired, the liquid resin or hardener may be adsorbed on a suitable finely divided, solid, inert carrier such as finely divided silica, silica aerogel and the like. The clay minerals of this invention may also act as adsorbent carriers for the liquid forms of epoxy resins or hardeners when all powder, free flowing compositions are desired.

Regardless of whether the systems are liquid or solid, the clay minerals may be admixed with either the resin portion, the hardener portion or the admixed resin-hardener portions of the multi-component embodiments, or with the admixture of resin and hardener constituting a one-component system.

The mineral containing clay must be incorporated into the epoxy resin composition prior to hardening so that it is then an integral component of the cured product. If this requirement is satisfied, a variety of methods and means for introducing the clay mineral into the system may be resorted to.

Epoxy resin compositions of the present invention may be used to good advantage as trowellable mortars and grouts ot set tile and brick, and to fill the joints between the tiles. When used for this purpose, the epoxy resin compositions form a hard, adherent joint resistant to many chemicals including organic acids.

The epoxy resin compositions of the present invention bond exceedingly well to almost any substratum and may be used as coatings, films, adhesives and filleting materials.

This application is a continuation-in-part of my earlier filed application, Ser. No. 391,319, filed Aug. 21, 1964.

The invention in its broader aspects is not limited to the specific steps, methods, compositions and improvements shown and described herein, but departures may be made within the scope of the accompanying claims without departing from the principles of the invention and without sacrificing its chief advantages.

What is claimed:

1. An epoxy resin polyfunctional amine composition which comprises:
    (a) an epoxy resin having at least two

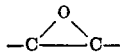

groups per molecule;
    (b) a cation containing clay mineral capable of imparting improved organic acid resistance to said composition, in a sufficient amount to impart improved organic acid resistance to said composition and in an amount of at least 15 percent by weight based on said epoxy resin, said clay mineral exhibiting a base-exchange capacity of at least about 15, said clay mineral comprising an exchangeable cation which is a member selected from the group consisting of alkali and alkaline earth metal cations, and mixtures of the foregoing; and
    (c) a polyfunctional amine curing agent capable of curing said epoxy resin at about room temperature and in sufficient amount to cure said epoxy resin at about room temperature.

2. The composition of claim 1 wherein said clay mineral (material) is present in said composition in the amount of at least about 50 percent by weight based on the weight of the epoxy resin.

3. An epoxy resin-polyfunctional amine composition which (is resistant to attack by organic acids and which) comprises:
    (a) an epoxy resin having at least two

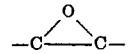

groups per molecule;
    (b) a cation containing clay mineral capable of imparting improved resistance to attack by organic acid to said composition, in a sufficient amount to impart improved resistance to attack by organic acids to said composition and in an amount of at least 15 percent based on the weight of the epoxy resin, said clay mineral exhibiting a base-exchange capacity of at least 20, said clay mineral having an exchangeable cation which is a member selected from the group consisting of alkali and alkaline earth metal cations, and mixtures of the foregoing; and
    (c) a polyfunctional amine curing agent capable of (entering into a crosslinking reaction with said epoxy resin and) curing said resin at about room temperature and in sufficient amount to cure said epoxy resin at about room temperature.

4. The composition of claim 3, wherein said clay mineral material is a member selected from the group consisting of montmorillonite, attapulgite, vermiculite, hectorite, saponite, illite and zeolite.

5. The composition of claim 3, wherein said clay mineral material comprises montmorillonite.

6. The composition of claim 3, wherein said clay mineral material comprises attapulgite.

7. The composition of claim 3, wherein said clay mineral material comprises vermiculite.

8. The composition of claim 3, wherein said polyfunctional amine comprises a member selected from the group consisting of amine, polyamine, polyamide, and amido amine hardening agents.

9. The composition of claim 3, wherein said polyfunctional amine comprises an amine hardening agent.

10. The composition of claim 3, wherein said polyfunctional amine comprises a polyamine hardening agent.

11. The composition of claim 3, wherein said polyfunctional amine comprises a polyamide hardening agent.

12. The composition of claim 3, wherein said polyfunctional amine comprises an amido amine hardening agent.

13. An adhesive composition which comprises:
    (a) an epoxy resin having at least two

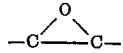

groups per molecule:
    (b) a cation containing clay mineral capable of imparting improved organic acid resistance to said composition, in a sufficient amount to impart improved organic acid resistance to said composition and in an amount of at least 15 percent by weight based on said epoxy resin, said clay mineral exhibiting a base-exchange capacity of at least 15, said clay mineral being a member selected from the group consisting of montmorillonite, attapulgite, hectorite, saponite, illite and zeolite and said clay mineral having an exchangeable cation which is a member selected from the group consisting of alkali and alkaline earth metal cations, and mixtures of the foregoing; and
    (c) a polyfunctional amine curing agent capable of curing said epoxy resin at about room temperature and in sufficient amount to cure said epoxy resin at about room temperature.

14. An adhesive bonding composition which comprises:
(a) an epoxy resin having at least two

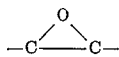

groups per molecule:
(b) a cation containing clay mineral capable of imparting improved organic acid resistance to said composition, in a sufficient amount to impart improved organic acid resistance to said composition and in an amount of at least 15 percent by weight based on the weight of said epoxy resin, said clay mineral exhibiting a base-exchange capacity of at least 20, said clay mineral being a member selected from the group consisting of montmorillonite, attapulgite, hectorite, saponite and illite, and said clay mineral having an exchangeable cation which is a member selected from the group consisting of alkali and alkaline earth metal cations and mixtures of the foregoing; and
(c) a polyfunctional amine curing agent capable of curing said epoxy resin at about room temperature and in a sufficient amount to cure said epoxy resin at about room temperature.

15. An adhesive bonding composition which comprises:
(a) an epoxy resin having at least two

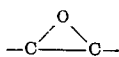

groups per molecule;
(b) a cation containing clay mineral capable of imparting improved organic acid resistance to said composition, in a sufficient amount to impart improved organic acid resistance to said composition and in an amount of at least 15 percent by weight based on the weight of said epoxy resin, said clay mineral exhibiting a base-exchange capacity of at least 20, said clay mineral comprising montmorillonite, and said clay mineral having an exchangeable cation which is a member selected from the group consisting of alkali and alkaline earth metal cations and mixtures of the foregoing; and
(c) a polyfunctional amine curing agent capable of curing said epoxy resin at about room temperature and in a sufficient amount to cure said epoxy resin at about room temperature.

16. An adhesive bonding composition which comprises:
(a) an epoxy resin having at least two

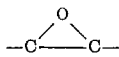

groups per molecule;
(b) a cation containing clay mineral capable of imparting improved organic acid resistance to said composition, in a sufficient amount to impart improved organic acid resistance to said composition and in an amount of at least 15 percent by weight based on the weight of said epoxy resin, said clay mineral exhibiting a base-exchange capacity of at least 20, said clay mineral comprising attapulgite, and said clay mineral having an exchangeable cation which is a member selected from the group consisting of alkali and alkaline earth metal cations and mixtures of the foregoing; and
(c) a polyfunctional amine curing agent capable of curing said epoxy resin at about room temperature and in a sufficient amount to cure said epoxy resin at about room temperature.

17. An adhesive bonding composition which comprises:
(a) an epoxy resin having at least two

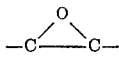

groups per molecule;
(b) a cation containing clay mineral capable of imparting improved organic acid resistance to said composition, in a sufficient amount to impart improved organic acid resistance to said composition and in an amount of at least 15 percent by weight based on the weight of said epoxy resin, said clay mineral exhibiting a base-exchange capacity of at least 20, said clay mineral comprising finely ground expanded vermiculite, and said clay mineral having an exchangeable cation which is a member selected from the group consisting of alkali and alkaline earth metal cations and mixtures of the foregoing; and
(c) a polyfunctional amine curing agent capable of curing said epoxy resin at about room temperature and in a sufficient amount to cure said epoxy resin at about room temperature.

18. An adhesive coating composition which comprises:
(a) an epoxy resin having at least two

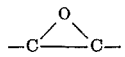

groups per molecule;
(b) a cation containing clay mineral capable of imparting improved organic acid resistance to said composition, in a sufficient amount to impart improved organic acid resistance to said composition and in an amount of at least 15 percent by weight based on the weight of said epoxy resin, said clay mineral exhibiting a base-exchange capacity of at least 20, said clay mineral being a member selected from the group consisting of montmorillonite, attapulgite, hectorite, saponite and illite, and said clay mineral having an exchangeable cation which is a member selected from the group consisting of alkali and alkaline earth metal cations, and mixtures of the foregoing; and
(c) a polyfunctional amine curing agent capable of curing said epoxy resin at about room temperature and in a sufficient amount to cure said epoxy resin at about room temperature.

19. An adhesive coating composition which comprises:
(a) an epoxy resin having at least two

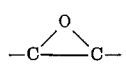

groups per molecule;
(b) a cation containing clay mineral capable of imparting improved organic acid resistance to said composition, in a sufficient amount to impart improved organic acid resistance to said composition and in an amount of at least 15 percent by weight based on the weight of said epoxy resin, said clay mineral exhibiting a base-exchange capacity of at least 20, said clay mineral consisting essentially of montmorillonite, and said clay mineral having an exchangeable cation which is a member selected from the group consisting of alkali and alkaline earth metal cations, and mixtures of the foregoing; and
(c) a polyfunctional amine curing agent capable of curing said epoxy resin at about room temperature and in a sufficient amount to cure said epoxy resin at about room temperature.

20. An adhesive coating composition which comprises:
(a) an epoxy resin having at least two

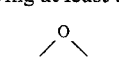

groups per molecule;
(b) a cation containing clay mineral capable of imparting improved organic acid resistance to said composition, in a sufficient amount to impart improved organic acid resistance to said composition and in an amount of at least 15 percent by weight based on the weight of said epoxy resin, said clay mineral exhibiting a base-exchange capacity of at least 20, said clay mineral consisting essentially of attapulgite, and said clay mineral having an exchangeable cation which is a member selected from the group consisting of alkali and alkaline earth metal cations, and mixtures of the foregoing; and
(c) a polyfunctional amine curing agent capable of curing said epoxy resin at about room temperature and in a sufficient amount to cure said epoxy resin at about room temperature.

21. An adhesive coating composition which comprises:
(a) an epoxy resin having at least two

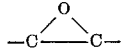

groups per molecule;
(b) a cation containing clay mineral capable of imparting improved organic acid resistance to said composition, in a sufficient amount to impart improved organic acid resistance to said composition and in an amount of at least 15 percent by weight based on the weight of said epoxy resin, said clay mineral exhibiting a base-exchange capacity of at least 20, said clay mineral consisting essentially of finely ground expanded vermiculite, and said clay mineral having an exchangeable cation which is a member selected from the group consisting of alkali and alkaline earth metal cations, and mixtures of the foregoing; and
(c) a polyfunctional amine curing agent capable of curing said epoxy resin at about room temperature and in a sufficient amount to cure said epoxy resin at about room temperature.

22. An adhesive grout and mortar composition which comprises:
(a) an epoxy resin having at least two

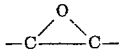

groups per molecule;
(b) a cation containing clay mineral capable of imparting improved organic acid resistance to said composition, in a sufficient amount to impart improved organic acid resistance to said composition and in an amount of at least 15 percent by weight based on the weight of said epoxy resin, said clay mineral exhibiting a base-exchange capacity of at least 20, said clay mineral being a member selected from the group consisting of montmorillonite, attapulgite, [vermiculite,] hectorite, saponite and illite, and said clay mineral having an exchangeable cation which is a member selected from the group consisting of alkali and alkaline earth metal cations, and mixtures of the foregoing; and
(c) a polyfunctional amine curing agent capable of curing said epoxy resin at about room temperature and in a sufficient amount to cure said epoxy resin at about room temperature.

23. An adhesive grout and mortar composition which comprises:
(a) an epoxy resin having at least two

groups per molecule;
(b) a cation containing clay mineral capable of imparting improved organic acid resistance to said composition, in a sufficient amount to impart improved organic acid resistance to said composition and in an amount of at least 15 percent my weight based on the weight of said epoxy resin, said clay mineral exhibiting a base-exchange capacity of at least 20, said clay mineral consisting essentially of montmorillonite, and said clay mineral having an exchangeable cation which is a member selected from the group consisting of alkali and alkaline earth metal cations, and mixtures of the foregoing; and
(c) a polyfunctional amine curing agent capable of curing said epoxy resin at about room temperature and in a sufficient amount to cure said epoxy resin at about room temperature.

24. An adhesive grout and mortar composition which comprises:
(a) an epoxy resin having at least two

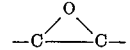

groups per molecule;
(b) a cation containing clay mineral capable of imparting improved organic acid resistance to said composition, in a sufficient amount to impart improved organic acid resistance to said composition and in an amount of at least 15 percent by weight based on the weight of said epoxy resin, said clay mineral exhibiting a base-exchange capacity of at least 20, said clay mineral consisting essentially of attapulgite, and said clay mineral having an exchangeable cation which is a member selected from the group consisting of alkali and alkaline earth metal cations, and mixtures of the foregoing; and
(c) a polyfunctional amine curing agent capable of curing said epoxy resin at about room temperature and in a sufficient amount to cure said epoxy resin at about room temperature.

25. An adhesive grout and mortar composition which comprises:
(a) an epoxy resin having at least two

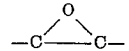

groups per molecule;
(b) a cation containing clay mineral capable of imparting improved organic acid resistance to said composition, in a sufficient amount to impart improved organic acid resistance to said composition and in an amount of at least 15 percent by weight based on the weight of said epoxy resin, said clay mineral exhibiting a base-exchange capacity of at least 20, said clay mineral consisting essentially of finely ground expanded vermiculite, and said clay mineral having an exchangeable cation which is a member selected from the group consisting of alkali and alkaline earth metal cations, and mixtures of the foregoing; and
(c) a polyfunctional amine curing agent capable of curing said epoxy resin at about room temperature and in a sufficient amount to cure said epoxy resin at about room temperature.

26. A room temperature cured epoxy resin and polyfunctional amine composition having improved resistance to attack by organic acid which contains, as the ingredient imparting improved organic acid resistance, a cation containing clay mineral exhibiting a base-exchange capacity of at least 20, in an amount of at least 15 percent by weight based on weight of said epoxy resin, said clay mineral being a member selected from the group consisting of montmorillonite, attapulgite, vermiculite, hectorite, saponite, illite and zeolite, said clay mineral having an exchangeable cation which is a member selected from the group consisting of alkali and alkaline earth metal cations, and mixtures of the foregoing.

27. The composition of claim 26, wherein said clay mineral is present in said composition in an amount of at least 50 percent by weight based on the weight of said epoxy resin.

28. A method for making tile surface resistant to attack by organic acid which comprises placing tile on a substrate containing a mortar so as to leave open spaces between the tiles, preparing an epoxy resin adhesive composition for filling the spaces between the tile, making said epoxy resin composition resistant to attack by organic acid by adding to said composition a sufficient amount of cation containing clay mineral, exhibiting a base-exchange capacity of at least 20, to impart improved resistance to attack by organic acid to said epoxy resin composition, said clay mineral being added in an amount of at least 15 percent by weight based on said epoxy resin, said clay mineral being selected from the group consisting of montmorillonite, attapulgite, hectorite saponite and illite, said clay mineral having an exchangeable cation which is a member selected from the group consisting of alkali and alkaline earth metal cations, and mixtures of the foregoing, adding to said epoxy resin compositions a sufficient amount of an epoxy resin polyfunctional amine curing agent, capable of curing said epoxy resin at about room temperature, to cure said epoxy resin, filling the spaces between said tiles with said composition, curing said epoxy resin composition at about room temperature, and exposing said cured composition and tile surface to an organic acid environment.

29. A method for making tile surface resistant to attack by organic acid which comprises placing tile on a substrate containing a mortar so as to leave open spaces between the tiles, preparing an epoxy resin adhesive composition for filling the spaces between the tile, making said epoxy resin composition resistant to attack by organic acid by adding to said composition a sufficient amount of cation containing clay mineral, exhibiting a base-exchange capacity of at least 20, to impart improved resistance to attack by organic acid to said epoxy resin composition, said clay mineral being added in an amount of at least 15 percent by weight based on said epoxy resin, said clay mineral comprising montmorillonite, said clay mineral having an exchangeable cation which is a member selected from the group consisting of alkali and alkaline earth metal cations, and mixtures of the foregoing, adding to said epoxy resin compositions a sufficient amount of an epoxy resin polyfunctional amine curing agent, capable of curing said epoxy resin at about room temperature, to cure said epoxy resin, filling the spaces between said tiles with said composition, curing said epoxy resin composition at about room temperature, and exposing said cured composition and tile surface to an organic acid environment.

30. A method for making tile surface resistant to attack by organic acid which comprises placing tile on a substrate containing a mortar so as to leave open spaces between the tiles, preparing an epoxy resin adhesive composition for filling the spaces between the tile, making said epoxy resin composition resistant to attack by organic acid by adding to said composition a sufficient amount of cation containing clay mineral, exhibiting a base-exchange capacity of at least 20, to impart improved resistance to attack by organic acid to said epoxy resin composition, said clay mineral being added in an amount of at least 15 percent by weight based on said epoxy resin, said clay mineral comprising attapulgite, said clay mineral having an exchangeable cation which is a member selected from the group consisting of alkali and alkaline earth metal cations, and mixtures of the foregoing, adding to said epoxy resin compositions a sufficient amount of an epoxy resin polyfunctional amine curing agent, capable of curing said epoxy resin at about room temperature, to cure said epoxy resin, filling the spaces between said tiles with said composition, curing said epoxy resin composition at about room temperature, and exposing said cured composition and tile surface to an organic acid environment.

31. A method for making tile surface resistant to attack by organic acid which comprises placing tile on a substrate containing a mortar so as to leave open spaces between the tiles, preparing an epoxy resin adhesive composition for filling the spaces between the tile, making said epoxy resin composition resistant to attack by organic acid by adding to said composition a sufficient amount of cation containing clay mineral, exhibiting a base-exchange capacity of at least 20 to impart improved resistance to attack by organic acid to said epoxy resin composition, said clay mineral being added in an amount of at least 15 percent by weight based on said epoxy resin, said clay mineral comprising finely ground expanded vermiculite, said clay mineral having an exchangeable cation which is a member selected from the group consisting of alkali and alkaline earth metal cations, and mixtures of the foregoing, adding to said epoxy resin compositions a sufficient amount of an epoxy resin polyfunctional amine curing agent, capable of curing said epoxy resin at about room temperature, to cure said epoxy resin, filling the spaces between said tiles with said composition, curing said epoxy resin composition at about room temperature, and exposing said cured composition and tile surface to an organic acid environment.

32. A method for making a surface resistant to attack by organic acid which comprises preparing an epoxy resin adhesive coating composition, making said epoxy resin composition resistant to attack by organic acid by adding to said coating composition a sufficient amount of cation containing clay mineral, exhibiting a base-exchange capacity of at least 15, to impart improved resistance to attack by organic acid to said epoxy resin composition, said clay mineral being added in an amount of at least 15 percent by weight based on said epoxy resin, said clay mineral material having an exchangeable cation which is a member selected from the group consisting of alkali and alkaline earth metal cations, and mixtures of the foregoing, adding to said epoxy resin composition a sufficient amount of an epoxy resin polyfunctional amine curing agent, capable of curing said epoxy resin at about room temperature, to cure said epoxy resin, coating said surface with said composition, curing said epoxy resin composition on said surface at about room temperature, and exposing said cured coating composition to an organic acid environment.

33. The method of claim 28, wherein said polyfunctional amine comprises a polyamide hardening agent.

34. The method of claim 28, wherein said polyfunctional amine comprises an amido amine hardening agent.

35. A method for making a surface resistant to attack by organic acid which comprises preparing an epoxy resin adhesive coating composition, making said epoxy resin composition resistant to attack by organic acid by adding to said coating composition a sufficient amount of cation containing clay mineral, exhibiting a base-exchange capacity of at least 20, to impart improved resistance to attack by organic acid to said epoxy resin composition, said clay mineral being added in an amount of at least 15 percent by weight based on said epoxy resin, said clay mineral being selected from the group consisting of montmorillonite, attapulgite, hectorite, saponite and illite, said clay mineral material having an exchangeable cation which is a member selected from the group consisting of alkali and alkaline earth metal cations, and mixtures of the foregoing, adding to said epoxy resin composition a sufficient amount of an epoxy resin polyfunctional amine curing agent, capable of curing said epoxy resin at about room temperature, to cure said epoxy resin, coating said surface with said composition, curing said epoxy resin composition on said surface at about room temperature, and exposing said cured coating composition to an organic acid environment.

36. A method for making a surface resistant to attack by organic acid which comprises preparing an epoxy resin adhesive coating composition, making said epoxy resin composition resistant to attack by organic acid by adding to said coating composition a sufficient amount of cation containing clay mineral, exhibiting a base-exchange capacity of at least 20, to impart improved resistant to attack by organic acid to said epoxy resin composition, said clay mineral being added in an amount of at least 15 percent by weight based on said epoxy resin, said clay mineral comprising montmorillonite, said clay mineral material having an exchangeable cation which is a member selected from the group consisting of alkali and alkaline earth metal cations, and mixtures of the foregoing, adding to said epoxy resin composition a sufficient amount of an epoxy resin polyfunctional amine curing agent, capable of curing said epoxy resin at about room temperature, to cure said epoxy resin, coating said surface with said composition, curing said epoxy resin composition on said surface at about room temperature, and exposing said cured coating composition to an organic acid environment.

37. A method for making a surface resistant to attack by organic acid which comprises preparing an epoxy resin adhesive coating composition, making said epoxy resin composition resistant to attack by organic acid by adding to said coating composition a sufficient amount of cation containing clay mineral, exhibiting a base-exchange capacity of at least 20, to impart improved resistance to attack by organic acid to said epoxy resin composition, said clay mineral being added in an amount of at least 15 percent by weight based on said epoxy resin, said clay mineral comprising attapulgite, said clay mineral material having an exchangeable cation which is a member selected from the group consisting of alkali and alkaline earth metal cations, and mixtures of the foregoing, adding to said epoxy resin composition a sufficient amount of an epoxy resin polyfunctional amine curing agent, capable of curing said epoxy resin at about room temperature, to cure said epoxy resin, coating said surface with said composition, curing said epoxy resin composition on said surface at about room temperature, and exposing said cured coating composition to an organic acid environment.

38. A method for making a surface resistant to attack by organic acid which comprises preparing an epoxy resin adhesive coating composition, making said epoxy resin composition resistant to attack by organic acid by adding to said coating composition a sufficient amount of cation containing clay mineral, exhibiting a base-exchange capacity of at least 20, to impart improved resistance to attack by organic acid to said epoxy resin composition, said clay mineral being added in an amount of at least 15 percent by weight based on said epoxy resin, said clay mineral comprising finely ground expanded vermiculite, said clay mineral material having an exchangeable cation which is a member selected from the group consisting of alkali and alkaline earth metal cations, and mixtures of the foregoing, adding to said epoxy resin composition a sufficient amount of an epoxy resin polyfunctional amine curing agent, capable of curing said epoxy resin at about room temperature, to cure said epoxy resin, coating said surface with said composition, curing said epoxy resin composition on said surface at about room temperature, and exposing said cured coating composition to an organic acid environment.

39. The method of claim 35, wherein said polyfunctional amine comprises a member selected from the group consisting of amine, polyamine, polyamide and amido amine hardening agents.

40. The method of claim 35, wherein said polyfunctional amine comprises a polyamide hardening agent.

41. The method of claim 35, wherein said polyfunctional amine comprises an amido amine hardening agent.

42. A new article of construction which is resistant to attack by organic acids which comprises tiles bonded to a support; said tiles being spaced so as to leave open spaces between said tiles; the spaces between said tiles containing a cured epoxy resin adhesive composition which comprises:

(a) an expoy resin having at least two

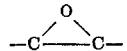

groups per molecule;

(b) a cation containing clay mineral imparting improved resistance to attack by organic acid to said composition, in a sufficient amount to impart improved resistance to attack by organic acid to said composition and in an amount of at least 15 percent by weight based on weight of said epoxy resin, said clay mineral exhibiting a base exchange capacity of at least 20, said clay mineral being a member selected from the group consisting of montmorillonite, attapulgite, [vermiculite,] hectorite, saponite, bentonite and illite, said clay mineral having an exchangeable cation which is a member selected from the group consisting of alkali and alkaline earth metal cations, and mixtures of the foregoing; and (c) a polyfunctional amine curing agent capable of curing said epoxy resin at about room temperature and in sufficient amount to have cured said epoxy resin at about room temperature.

43. A new article of construction which is resistant to attack by organic acids which comprises a cured organic acid resistant coating adhesively bonded to a surface, said coating comprising:

(a) an epoxy resin having at least two

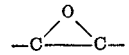

groups per molecule;

(b) a cation containing clay mineral imparting improved resistance to attack by organic acid to said composition, in a sufficient amount to impart improved resistance to attack by organic acid to said composition and in an amount of at least 15 percent by weight based on weight of said epoxy resin, said clay mineral exhibiting a base exchange capacity of at least 20, said clay mineral being a member selected from the group consisting of montmorillonite, attapulgite, [vermiculite,] hectorite, saponite, bentonite and illite and said clay mineral having an exchangeable cation which is a member selected from the group consisting of alkali and alkaline earth metal cations and mixtures of the foregoing; and (c) a polyfunctional amine curing agent capable of curing said epoxy resin at about room temperature and in a sufficient amount to have cured said epoxy resin at about room temperature.

References Cited

UNITED STATES PATENTS

| | | | |
|---|---|---|---|
| 2,934,452 | 4/1960 | Sternberg | 260—18 |
| 3,159,499 | 12/1964 | Jorda | 260—18 |
| 3,297,635 | 1/1967 | Bergman et al. | 260—37 |
| 2,751,775 | 6/1956 | Sergovic | 94—3 |
| 2,788,337 | 4/1957 | Preiswerk | 260—37 |
| 3,021,234 | 2/1962 | Casement et al. | 260—37 |
| 3,196,122 | 7/1965 | Evans | 94—3 |
| 3,228,911 | 1/1966 | Rogier | 260—37 |
| 3,209,500 | 10/1965 | Bernett | 260—37 |

FOREIGN PATENTS 83,093　9/1956　Netherlands.

OTHER REFERENCES

Lee, et al.: "Epoxy Resins," McGraw-Hill Book Co., New York, N.Y., 1957, pp. 146–147 relied upon.

MORRIS LIEBMAN, *Primary Examiner.*

J. E. CALLAGHAN, *Assistant Examiner.*